(12) United States Patent
Tsatsou et al.

(10) Patent No.: US 8,620,964 B2
(45) Date of Patent: Dec. 31, 2013

(54) ONTOLOGY CONSTRUCTION

(75) Inventors: Dorothea Tsatsou, Thessaloniki (GR); Paul C. Davis, Arlington Heights, IL (US); Jianguo Li, Chicago, IL (US); Ioannis Kompatsiaris, Thermi (GR); Symeon Papadopoulos, Thermi (GR)

(73) Assignee: Motorola Mobility LLC, Libertyville, IL (US)

( * ) Notice: Subject to any disclaimer, the term of this patent is extended or adjusted under 35 U.S.C. 154(b) by 0 days.

(21) Appl. No.: 13/301,345

(22) Filed: Nov. 21, 2011

(65) Prior Publication Data
US 2013/0132442 A1 May 23, 2013

(51) Int. Cl.
*G06F 17/30* (2006.01)

(52) U.S. Cl.
USPC .............. 707/798; 707/803; 707/810

(58) Field of Classification Search
USPC ........................................... 707/798
See application file for complete search history.

(56) References Cited

U.S. PATENT DOCUMENTS

| | | | | |
|---|---|---|---|---|
| 7,018,450 | B2 * | 3/2006 | Rojey et al. | 95/193 |
| 7,041,156 | B2 * | 5/2006 | Bras et al. | 95/211 |
| 2002/0078090 | A1 * | 6/2002 | Hwang et al. | 707/513 |
| 2003/0018616 | A1 | 1/2003 | Wilbanks et al. | |
| 2004/0039564 | A1 * | 2/2004 | Mueller | 704/9 |
| 2005/0034107 | A1 * | 2/2005 | Kendall et al. | 717/136 |
| 2005/0149494 | A1 * | 7/2005 | Lindh et al. | 707/3 |
| 2006/0053172 | A1 * | 3/2006 | Gardner et al. | 707/203 |
| 2008/0021700 | A1 * | 1/2008 | Moitra et al. | 704/9 |
| 2008/0275694 | A1 | 11/2008 | Varone | |
| 2009/0112910 | A1 * | 4/2009 | Picault et al. | 707/102 |
| 2009/0198642 | A1 * | 8/2009 | Akkiraju et al. | 706/54 |
| 2009/0259459 | A1 * | 10/2009 | Ceusters et al. | 704/9 |
| 2009/0328133 | A1 * | 12/2009 | Strassner et al. | 726/1 |
| 2010/0030552 | A1 * | 2/2010 | Chen et al. | 704/9 |
| 2010/0281025 | A1 * | 11/2010 | Tsatsou et al. | 707/733 |
| 2011/0087670 | A1 * | 4/2011 | Jorstad et al. | 707/741 |

FOREIGN PATENT DOCUMENTS

| | | |
|---|---|---|
| WO | 2010033346 A2 | 3/2010 |
| WO | 2010129165 A2 | 11/2010 |

OTHER PUBLICATIONS

S. Papadopoulos, A. Vakali, Y. Kompatsiaris: "Community Detection in Collaborative Tagging Systems," in Book Community-Built Database: Research and Development, Springer (2011).
S. Papadopoulos, Y. Kompatsiaris, and A. Vakali: "Leveraging Collective Intelligence Through Community Detection in Tag Networks," in Proceedings of CKCaR 2009 Workshop on Collective Knowledge Capturing and Representation, Redondo Beach, California, USA (Sep. 1, 2009).

(Continued)

*Primary Examiner* — Binh V Ho (57) ABSTRACT

Disclosed are methods in which ontologies are automatically (i.e., with little or no human interaction) constructed from data. The constructed ontology may be provided for use by an application or device. An ontology may be constructed as follows. Firstly, a lexical graph is constructed. Secondly, a concept-detection process is performed on the lexical graph to detect concepts (prominent terms) in the lexical graph. Thirdly, a clustering method is performed on the lexical graph to form groups of concepts. Fourthly, relationships between the concepts are determined based on the interconnections of the concepts in the groups. Lastly, the concepts and detected relationships therebetween are structured using a formal ontology specification.

19 Claims, 3 Drawing Sheets

(56) References Cited

OTHER PUBLICATIONS

D. Tsatsou, F. Menemenis, I. Kompatsiaris, and P. C. Davis: "A Semantic Framework for Personalized Ad Recommendation Based on Advanced Textual Analysis", 3rd ACM Conference on Recommender Systems (RecSys'09), pp. 217-220, NY, USA, Oct. 2009.

S. Papadopoulos, F. Menemenis, Y. Kompatsiaris, and B. Bratu: "Lexical Graphs for Improved Contextual Ad Recommendation". In Proceedings of the 31st European Conference on Information Retrieval (Toulouse, France, Apr. 7-9, 2009). ECIR '09.

Bax, I et al.: Face Detection and Identification Using a Hierarchical Feed-Forward Recognition Architecture, Proc. IEEE Int'l Joint Conf. Neural Networks, 1675-1680, Montreal, Quebec, Canada, 2005.

P. Cimiano, J. Volker. "Text2Onto—A Framework for Ontology Learning and Data-driven Change Discovery". In: Proceedings of the 10th International Conference on Applications of Natural Language to Information Systems NLDB, vol. 3513 Alicante, Spain: Springer, Jun. 2005, p. 227-238.

Mika, P. Ontologies are us: A unified model of social networks and semantics. Web Semantics: Science, Services and Agents on the World Wide Web, vol. 5 Issue 1, pp. 5-15, Mar. 2007.

Papadopoulos, Symeon et al.: "Community Detection in Social Media Performance and Application Considerations", Data Mining and Knowledge Discovery, vol. 24, No. 3, (2012), DOI: 10.1007/s10618-011-0224-z, from the Issue entitled "SI: A Decade of Mining the Web", pp. 515-554.

* cited by examiner

ONTOLOGY CONSTRUCTION

FIELD OF THE INVENTION

The present invention relates to the construction of ontologies from data.

BACKGROUND OF THE INVENTION

Ontologies are particularly useful in terms applications in which accuracy of results can be improved with more world/domain knowledge, such as user profiling in general, search and recommendation applications, advertising, etc. In such applications knowledge of a domain can be used to determine what concepts relate to one another and how. This facilitates sophisticated and precise matching.

However, ontologies often require human experts and thus typically are difficult and expensive to create.

SUMMARY OF THE INVENTION

According to aspects of the present invention, an ontology is automatically (i.e., with little or no human interaction) constructed from data. The ontology may be constructed as follows. Firstly, a lexical graph that represents the interconnections and statistical attributes regarding the data in the domain is constructed. Secondly, a concept-detection process is performed on the lexical graph to detect prominent terms, commonly known as and hereinafter referred to as "concepts," in the lexical graph. Thirdly, a clustering method is performed on the lexical graph to form groups or clusters of detected concepts. Each group/cluster may comprise concepts that are relatively densely interconnected in the lexical graph. Fourthly, relationships (e.g., sibling relationships) between the concepts may be detected (e.g., based on the connections of these groups). The concepts and relationships therebetween may then be specified or explicitly defined (e.g., as rules or axioms) using a formal ontology specification.

Preferably, the concept-detection process comprises determining a weight of significance for each term in the lexical graph and identifying as a concept those terms that have a weight of significance greater than or equal to a predetermined threshold value (e.g., an automatically and statistically predetermined threshold value).

Preferably, the clustering method used is a community-detection process. A community-detection process advantageously may be applied to simple term-resource networks as well as to folksonomies. A community-detection process tends to form groups/clusters of relatively highly densely interconnected concepts. A community-detection process may comprise, for each pair of connected nodes in the lexical graph, determining a structural similarity value and grouping together those two connected nodes if that structural similarity value calculated for two nodes is above a further predetermined threshold value. Thus, one or more "seed sets" of nodes may be formed.

Preferably, each seed set is then expanded, e.g., by attaching to it those common nodes that many of the members of the seed set nodes are connected to. Nodes may be attached to the seed set such that certain criteria are satisfied, e.g., such that subgraph modularity is maximised or that community modularity is maximised.

Preferably, the detecting of relationships between the detected concepts comprises detecting the overlap between interconnected concepts in different communities/groups, e.g., by determining the transitive closure of the concepts.

This may be performed by performing a Floyd-Warshall algorithm extended to apply to weighted graph connections (i.e., a fuzzy Floyd-Warshall algorithm) on the terms in the lexical graph.

The constructed ontology may be provided for use by an application (e.g., software application) or a device (e.g., end-user hardware). The constructed ontology tends to be usable to depict domain semantics. The ontology can be structured in a formal conceptualization. Such formalisation provides a machine-understandable, uniform representation that advantageously tends to allow for efficient reasoning. This is achievable whilst minimising or eliminating human intervention.

DETAILED DESCRIPTION

In the following description, like reference numerals refer to like elements.

The following description is based on embodiments of the invention and should not be taken as limiting the invention with regard to alternative embodiments that are not explicitly described herein.

Figure 1:
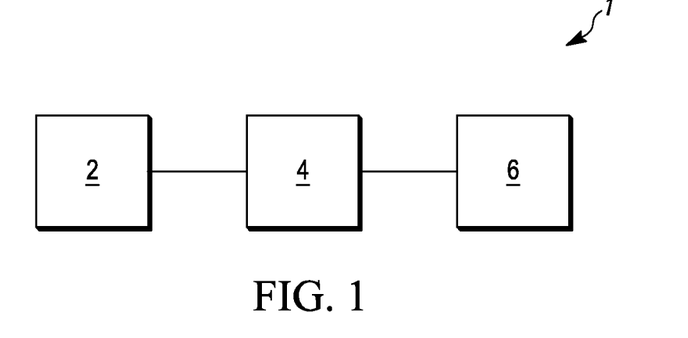
FIG. 1 is a schematic illustration (not to scale) of an example of a network in which an embodiment of a method of automatic ontology construction is implemented.

Referring now to the Figures, FIG. 1 is a schematic illustration (not to scale) of an example of a network 1 in which an embodiment of a method of automatic ontology construction is implemented.

The network 1 comprises a data source 2, a processor 4, and one or more applications or devices (which are collectively hereinafter referred to as the "users" and are indicated in FIG. 1 by a single box and the reference numeral 6). In other words, the terminology "users" is used herein to refer to one or more applications (e.g., software applications) or devices (e.g., hardware).

Apparatus, including the processor 4, for implementing the above arrangement, and for performing the method steps to be described later below, may be provided by configuring or adapting any suitable apparatus, for example one or more computers or other processing apparatus or processors, or providing additional modules. The apparatus may comprise a computer, a network of computers, or one or more processors, for implementing instructions and using data, including instructions and data in the form of a computer program or plurality of computer programs stored in or on a machine-readable storage medium such as computer memory, a computer disk, ROM, PROM, etc., or any combination of these or other storage media.

In this example, the data source 2 is a source of digitised data, for example a database. The data in the data source 2 are a collection of text documents. An ontology that represents knowledge within these text documents is to be constructed. Also, the data source 2 is coupled to the processor 4.

The processor 4 is arranged to process data retrieved, or received, from the data source 2. In this example, the processor 4 is arranged to, using the data from the data source 2, automatically construct an ontology for that data. The automatic construction of the ontology by the processor 4 is described in more detail later below with reference to FIG. 3.

In addition to being coupled to the data source 2, the processor 4 is coupled to the users 6, such that each of the users 6 has access to the ontology constructed by the processor 4.

It should be noted that certain of the process steps depicted in the flowcharts of FIGS. 2 and 3 and described below may be omitted or such process steps may be performed in differing order to that presented below and shown in those Figures. Furthermore, although all the process steps have, for convenience and ease of understanding, been depicted as discrete temporally-sequential steps, nevertheless some of the process steps may in fact be performed simultaneously or at least overlapping to some extent temporally.

Figure 2:
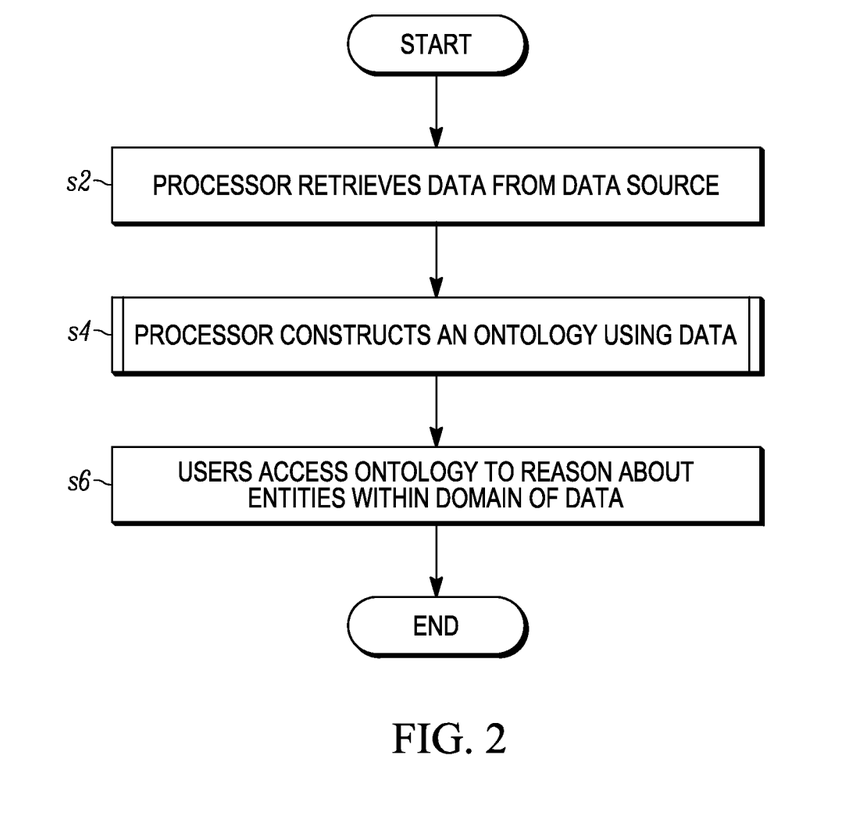
FIG. 2 is a flow chart showing certain steps of an example process performed by the entities of the network.

FIG. 2 is a flow chart showing certain steps of an example process performed by the entities of the network 1. In this example process, an embodiment of a method of automatic ontology construction is implemented.

At step s2, the processor 4 retrieves data from the data source 2.

At step s4, the processor 4 performs a method of automatic ontology construction on the data retrieved from the data source 2. Thus, an ontology that formally describes concepts and the relationships between those concepts with the domain of the data from the data source 2 is generated. The method of automatic ontology construction performed at step s4 is described in more detail later below with reference to FIG. 3.

At step s6, the users 6 access the ontology from the processor 4. In this example, the users 6 may utilise the ontology in any appropriate way. For example, the users 6 may use the ontology to drive application menus or as a learning resource.

Thus, a process performed by the entities of the network 1 in which a method of automatic ontology construction is implemented is provided.

Figure 3:
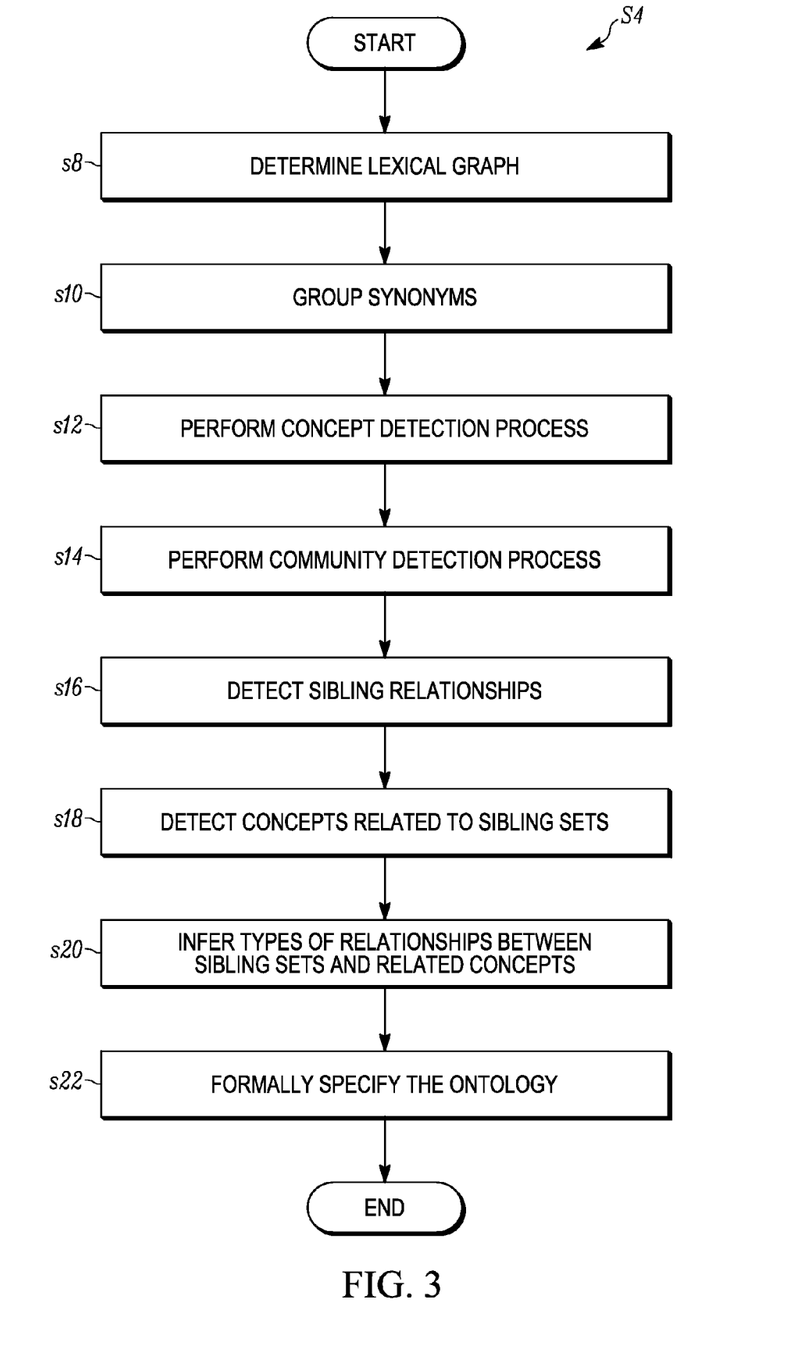
FIG. 3 is a process flow chart showing certain steps of the embodiment of a method of automatic ontology construction.

FIG. 3 is a process flow chart showing certain steps of the embodiment of the method of automatic ontology construction, as performed at step s4 of the method of FIG. 2. In this embodiment, the method of automatic ontology construction is performed by the processor 4.

At step s8, a lexical graph (i.e., a semantic network) is determined from the data. The terminology "lexical graph" is used herein to refer to any network of connected terms. Furthermore, the lexical graph may be represented in any appropriate format, e.g., as a diagram or as software.

In this embodiment, the lexical graph is generated from the data using the process described in more detail in "Lexical Graphs for Improved Contextual Ad Recommendation," S. Papadopoulos, F. Menemenis, Y. Kompatsiaris, and B. Bratu, Proceedings of the 31st European Conference on Information Retrieval (Toulouse, France, Apr. 7-9, 2009), ECIR 2009, which is incorporated herein by reference. In other embodiments, the lexical graph is generated using the process described in the published International Patent Application WO2010033346 "Selection of Associated Content for Content Items," Waddington et al., which is incorporated herein by reference. However, in other embodiments, the lexical graph is generated from the data using a different process.

In this embodiment, the lexical graph formed at step s8 is a connected graph that comprises a plurality of terms which are connected together by edges. However, in other embodiments not all of the nodes of the lexical graph are connected to a given other node. Furthermore, between any two nodes there is at most one edge.

Each term of the lexical graph corresponds to a particular data term (i.e., a term comprising one or more words from a text document) within the data (i.e., within the collection of text documents) that is extracted from the data during construction of the lexical graph. Furthermore, each term may have associated with it additional information, for example the following information:

a lemma (i.e., a text string representation of the respective term);

term frequency (i.e., the frequency with which the respective term occurs in the data);

document frequency (i.e., the number of distinct text documents in which the respective term occurs); and a term type (e.g., a part of speech ("POS") tag for the respective term).

The edges (which are extracted from the data during construction of the lexical graph) are indicative of the relationships between the terms that they connect. Furthermore, each edge may be associated with additional information, for example "term co-occurrence" information (i.e., the number of distinct text documents or text fragments, e.g., sentences, in which terms joined by the particular edge both occur).

In other embodiments, terms or edges of a lexical graph may comprise, or be associated with, a different set of information (which may include values for parameters in addition to or instead of those mentioned above).

At step s10, data terms within the lexical graph that are synonymous, as well as their respective graph neighbourhoods, are grouped together. This may be performed, for example, using the synonym-detection process described in more detail in "A Semantic Framework for Personalized Ad Recommendation Based on Advanced Textual Analysis," D. Tsatsou, F. Menemenis, I. Kompatsiaris, and P. C. Davis, 3rd ACM Conference on Recommender Systems (RecSys '09), pp. 217-220, NY, USA, October 2009. This synonym detection process is also described in the published International Patent Application WO2010129165 "Method and System for Recommendation of Content Items," D. Tsatsou et al. These documents are both incorporated herein by reference. In other embodiments a different synonym-grouping process may be used.

Figure 4:
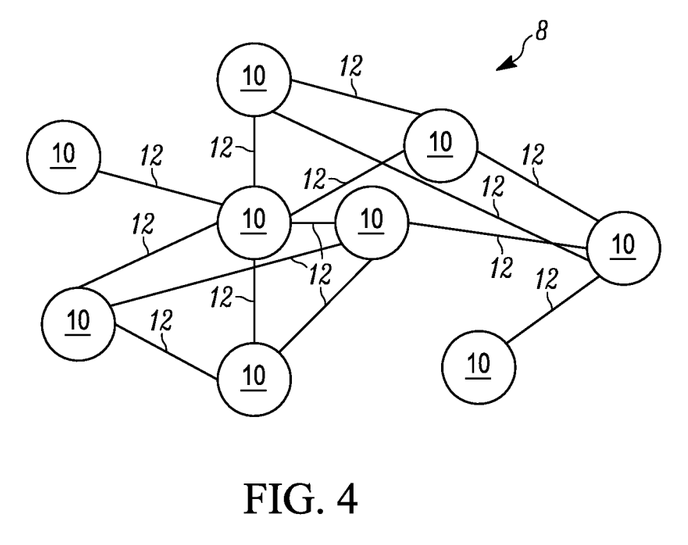
FIG. 4 is a schematic illustration (not to scale) of an example of a lexical graph produced during the process of FIG. 3.

FIG. 4 is a schematic illustration (not to scale) of an example of a lexical graph 8 produced after performing steps s8 and s10 as described above. Each of the nodes 10 of the lexical graph 8 corresponds to one or more data terms. The nodes 10 of the lexical graph 8 are connected together in the lexical graph 8. Each edge 12 of the lexical graph 8 is representative of a relationship between the terms that it connects together.

At step s12, a concept-detection process is performed on the lexical graph 8. The concept detection is performed to detect the most prominent terms in the lexical graph 8, i.e., to identify and select concepts that best describe the domain of the data.

An example concept-detection process comprises assigning a "weight of significance" to a term in the domain. For example, a weight of significance ("W") may be determined using the following formulae:

$$W_i = \frac{W_{local}}{W_{global}}$$

$$W_{local} = \log(TFIDF_i * degree_i)$$

$$W_{global} = \log(\max(TFIDF_G) * \max(degree_G))$$

where:

$W_i$ is the weight of significance of the ith term;

$TFIDF_i$ is the term frequency-inverse document frequency ("TFIDF") of the ith term;

max(TFIDF$_G$) is the maximum TFIDF of a term has over the whole lexical graph 8;

degree$_i$ is the number of edges incident to the ith term; and max(degree$_G$) is the maximum number of edges incident to a term across the whole lexical graph 8.

Using this weight of significance, the concepts (i.e., the most prominent graph terms, e.g., the terms that are important or characteristic or illustrative of the domain in which it appears) may be selected in any appropriate way, e.g., by applying one or more predetermined thresholds to the weight of significance and performing a global graph filtering process (i.e., excluding or removing from the lexical graph 8 the nodes 10 that have a weight of significance below one or more predetermined threshold values). A global graph filtering process may be performed to exclude, from the lexical graph 8, generic nodes that appear in cross-domain graphs. Further information on graph-filtering processes can be found, for example, in "Lexical Graphs for Improved Contextual Ad Recommendation," S. Papadopoulos, F. Menemenis, Y. Kompatsiaris, and B. Bratu, Proceedings of the 31st European Conference on Information Retrieval (Toulouse, France, Apr. 7-9, 2009), ECIR 2009.

In other embodiments a different type of weight of significance, calculated in a different way, may be used. Also, any other process by which the concepts may be detected or selected may be used.

At step s14, a community-detection process is performed on the lexical graph 8. The community-detection process inter alia groups together the concepts selected at step s12 into communities (i.e., groups or clusters) that are highly related (i.e., densely connected in the lexical graph 8) relative to other relationships in the lexical graph. Furthermore, in this embodiment the community-detection process assigns one or more weights to each concept. Each weight assigned to a concept is indicative of a confidence that that node belongs to a community into which that concept has been grouped.

The community-detection process used in this embodiment is a co-occurrence-based process, e.g., as described in more detail in "Leveraging Collective Intelligence Through Community Detection in Tag Networks," S. Papadopoulos, Y. Kompatsiaris, and A. Vakali in Proceedings of CKCaR 2009 Workshop on Collective Knowledge Capturing and Representation, Redondo Beach, Calif., USA (Sep. 1, 2009), which is incorporated herein by reference. The concepts (selected at step s12) are used as a seed for the community-detection process.

During the community-detection process, a "structural similarity" value is determined for each pair of directly connected (i.e., connected by a single edge) nodes 10 in the lexical graph 8. A structural similarity value for two directly connected nodes 10 may be calculated as the ratio of the number of nodes that are directly connected to both of those two nodes 10 (i.e., number of common nodes) and the number of nodes that are directly connected to at least one of those two nodes 10. If a structural similarity value for two directly connected nodes 10 is below a predetermined threshold value, then those two nodes are not grouped together. However, if a structural similarity value for two directly connected nodes 10 is greater than or equal to that predetermined threshold value, then those two nodes are grouped together. Thus, one or more "seed sets" of nodes may be formed. Each seed set may then be expanded, e.g., by attaching to it those common nodes 10 that many of the members of the seed set nodes 10 are connected to. Nodes may be attached to the seed set such that certain criteria are satisfied, e.g., such that subgraph modularity is maximised, or that community modularity is maximised. The modularity of a subgraph may be defined as the ratio of the number of intra-community edges (edges connecting nodes within the subgraph) over the number of edges protruding from the subgraph as described in more detail in "Leveraging Collective Intelligence Through Community Detection in Tag Networks," S. Papadopoulos, Y. Kompatsiaris, and A. Vakali in Proceedings of CKCaR 2009 Workshop on Collective Knowledge Capturing and Representation, Redondo Beach, Calif., USA (Sep. 1, 2009).

In other embodiments a different type of community-detection process (for example a different graph-clustering method) is used.

The community-detection process tends to detect groups of nodes 10, those groups containing nodes 10 that are more densely connected to each other than to the nodes 10 in the rest of the lexical graph 8. Also, in this embodiment, the nodes in each group are assigned a weight indicative of the confidence that this node belongs to that community. An example weighting scheme is presented in S. Papadopoulos, A. Vakali, Y. Kompatsiaris, "*Community Detection in Collaborative Tagging Systems*," in Book Community-Built Database: Research and Development, Springer (2011), which is incorporated herein by reference.

Figure 5:
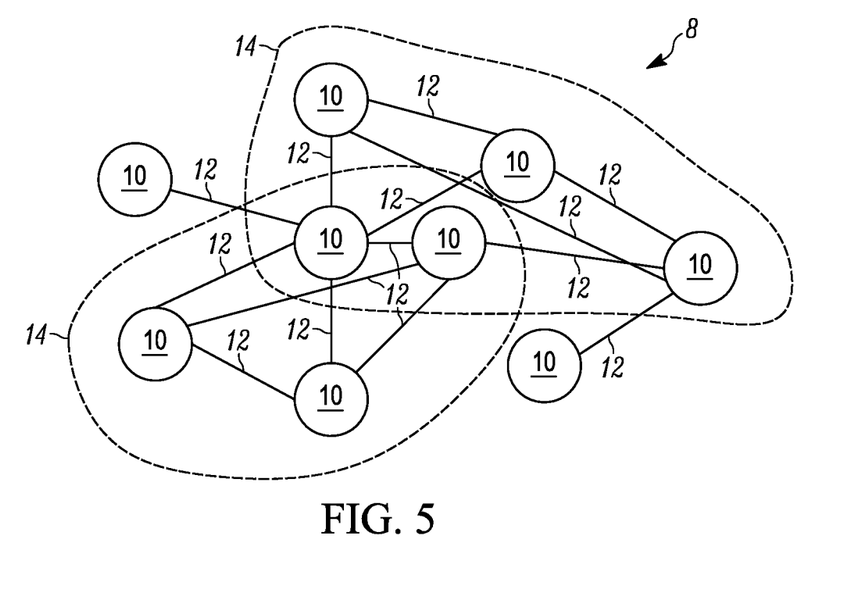
FIG. 5 is a schematic illustration (not to scale) of the lexical graph with detected communities shown thereon.

FIG. 5 is a schematic illustration (not to scale) of the example lexical graph 8 after performing the community-detection process of step s14. In FIG. 5 the communities of nodes detected by performing the community-detection process are indicated by dotted lines and the reference numeral 14.

The community-detection process advantageously may be applied to simple term-resource networks as well as to folksonomies. The communities produced by performing the community-detection process advantageously tend to include immediate relating concepts. The community detection advantageously tends to be scalable and computationally efficient (in particular, in this embodiment the estimation of cluster numbers or cluster sizes is not performed). Furthermore, the community detection advantageously tends to allows for overlapping clusters and also tends to facilitate noise reduction.

The community-detection process may be performed such that, in each group or community of concepts, each of the concepts in that community is connected to each of the other concepts of that group via either a single edge of the lexical graph or by one or more concepts of that group and a plurality of edges (such that between any two concepts there is at most one edge).

At step s16, sibling relationships in the communities 14 detected at s14 are detected based on the connections between concepts within their respective communities. Sibling relationships in the communities 14 may be determined using any appropriate process. In this embodiment, sibling relationships in the communities are detected using a process that comprises determining the transitive closure of sets of concepts of the same term type in each community 14. This forms transitive subsets of the lexical graph 8. These transitive subsets comprise the overlap between the communities 14. Nodes in the overlap between given communities are deemed to have sibling relationships with each other.

The process of step s16 is performed by performing, for each term type, a Floyd-Warshall algorithm extended to apply to weighted graph connections (i.e., a fuzzy Floyd-Warshall algorithm). Further information on the Floyd-Warshall algorithm may be found, for example, at http://en.wikipedia.org/wiki/Floyd-Warshall_algorithm which is incorporated herein by reference.

The fuzzy Floyd-Warshall algorithm may be implemented as follows.

Firstly, a fuzzy adjacency matrix of all the concepts connected in the communities 14 is produced. The adjacency weights in this matrix may be determined by the weight of each term in a given community. If two terms are related within two different communities with a different weight, then the maximum of the weights describing their relationship may be applied.

Secondly, the Floyd-Warshall algorithm is performed to find the shortest paths between terms in the matrix.

Thirdly, a path to travel between two endpoint terms is then reconstructed using the Floyd-Warshall algorithm.

An expanded (fuzzy) adjacency matrix is then created. In this final adjacency matrix, a pair-wise "degree of transition" (i.e., confidence degree) between all examined concepts is provided (i.e., for node [n][m] the matrix will contain the degree of confidence of the concept n being adjacent to concept m). This confidence degree may be determined by a product of the adjacencies (based on the original adjacency matrix) between the traversed nodes from n to m based on the reconstruction path.

Finally, the expanded (fuzzy) adjacency matrix (i.e., the transitive closure matrix) is then sorted into transitive subsets based on the produced confidence degrees. This sorting of the transitive closure matrix may comprise setting a threshold for the confidence degree values and not including in the transitive subsets those terms that correspond to a confidence degree that is below this threshold. Terms that correspond to a confidence degree that is greater than or equal to this threshold may be included in the transitive subsets. For example, the threshold for the confidence degree values may be equal to the standard deviation of the transitive closure matrix. In certain embodiments, only the highest-weighted adjacencies may be promoted (i.e., only the terms that correspond to the highest confidence degrees of belonging to a transitive subset may be included in that transitive subset).

Thus, coherent transitive subsets (each comprising densely connected terms) of the concepts in the lexical graph 8 are detected.

These detected transitive subsets of the lexical graph 8 correspond to areas in the communities 14 that are most densely connected together. Also, these transitive subsets comprise the "overlap" between communities (concepts that co-exist in two or more communities). The nodes/concepts in the overlap between two or more given communities are "siblings" (i.e., have sibling relationships). These sets of sibling nodes will hereinafter be referred to as "sibling sets".

The use of fuzzy transitive sets tends to take into account deviations in graph statistics. Also, fuzzy transitive sets can provide greater insight into the density and hierarchy of connections between nodes 10.

In this embodiment, the process of detecting the sibling sets (i.e., the fuzzy Floyd-Warshall algorithm) is performed per term type (e.g., POS tag, etc.). In other words, to detect sibling relationships, only the transitive closure of the interconnections within each community between concepts having the same term type are considered. This is in contrast to the process for detecting other types of relationships (described below at step s18) in which transitive sets defined over the whole lexical graph are considered.

At step s18, terms in the lexical graph related to each of the sibling sets (formed at step s16) are detected. Terms related to the siblings set may be detected using any appropriate process. In this embodiment, these terms are detected by determining the transitive closure of the whole lexical graph 8. In this embodiment, this is performed by performing, irrespective of term type (as opposed to for each term type, as performed at step s16), a fuzzy Floyd-Warshall algorithm on the whole lexical graph 8. This process identifies the most closely related terms to each of the sibling sets produced at step s16. This process may also performed for single terms not found to belong to any specific sibling set after step s16 in order to detect terms closely related terms.

The fuzzy Floyd-Warshall algorithm may be performed as described above with reference to step s16. However, at step s18, to detect terms in the lexical graph 8 related to the sibling sets, the fuzzy Floyd-Warshall algorithm is performed irrespective of term type (i.e., over every term in the lexical graph 8).

In other words, using the fuzzy Floyd-Warshall algorithm for the entire transitive superset (regardless of term type) the terms connected to previously determined sibling sets are detected, i.e., the relatives of a sibling set are retrieved.

Optionally, relatives of a transitive subset that have the same term type as that of a sibling set may be merged with the sibling set. This step comprises adding concepts to a sibling set (of the same entity type as that set) that were disregarded in the previous process of step s16, e.g., due to being more densely connected to another sibling set. In other words, in this embodiment, whereas at step s16 a concept was part of one sibling set only, at step s18 that concept may be part of any number of different sibling sets. Thus, at step s18, the siblings and thus their relatives may be redefined.

At step s20, the types of the relationships between each siblings set and the relatives of that siblings set are inferred.

The inferring of these additional relationships (i.e., relationships other than sibling relationships) may be performed by any appropriate method, for example by using statistical methods.

For example, an "ancestor" relationship between a sibling set and a relative of that sibling set may be inferred if the following criteria is satisfied:

$$W_R > \mathrm{avg}(W_{SS}) + \mathrm{std}(W_{G_t \in G})$$

where:
- $W_R$ is the weight of significance of the relative R;
- $\mathrm{avg}(W_{SS})$ is the average of the weights of significance of the concepts in the sibling set SS (which have a term type t) to which the relative R is related; and
- $\mathrm{std}(W_{G_t \in G})$ is the standard deviation between all of the weights of significance of the nodes in the lexical graph G that are of term type t. In other embodiments, the term $\mathrm{std}(W_{G_t \in G})$ may be replaced, e.g., by $\mathrm{std}(W_G)$, i.e., the standard deviation between all of the weight of significances of the nodes in whole lexical graph G.

Also, a "descendent" relationship between a sibling set and a relative of that sibling set may be inferred if the following criteria is satisfied:

$$W_R < \mathrm{avg}(W_{SS}) - \mathrm{std}(W_{G_t \in G})$$

Other criteria may be used to infer different types of relationships between concepts.

The concepts and relationships between those concepts, that are detected or inferred using the above described method steps s8 to s20, form an ontological structure which represents knowledge within the domain of the data.

At step s22, the concepts and relationships between those concepts are specified by a formal ontological specification (i.e., an ontological language). This formally specifies the concepts, the nature and type of the relationships between those concepts, and the how the concepts and relationships are structured.

The produced formal ontology comprises concepts and relationships between those concepts and has a structure which may be guided and defined through axioms. These axioms may be specified and defined via the formal ontological language. Axioms, rules, and restrictions on the concepts and the relationships may be specified.

Any appropriate ontological language may be used, for example, RDF (Resource Description Framework), N3 (Notation 3), Turtle (Terse RDF Triple Language), N-Triples, RDFS (Resource Description Framework Schema), OWL (Web Ontology Language), Manchester syntax, Functional syntax, OBO (Open Biomedical Ontologies), KRSS2 (Knowledge Representation System Specification) or KRSS formalisations. Such formalisation provides a machine-understandable, uniform representation for ontologies that advantageously tends to allow for efficient reasoning.

Thus, a method of automatic ontology construction is provided.

The (formal) ontology produced by performing the above described method steps may be made available by the processor 4 to the users 6 in any appropriate way. For example, the processor 4 may make the ontology available to an application or device e.g., over the Internet (e.g., via a web server), or the processor may transmit (e.g., using a transmitter) the ontology for use by an application or device.

Advantageously, using the above described method, an ontology may be created from data without the use of or input of human experts (or humans at all). This is especially true in cases where there are data regarding usage in the given domain. Moreover, using the above described method it tends to be possible to efficiently update the created ontology, e.g., when additional data become available. In other words, the above described method is advantageously agile and adaptable to domain changes.

The above described automatic ontology construction method tends to be usable to uncover domain semantics from unstructured text or data. Knowledge can be structured in a formal conceptualization. This is achievable whilst minimising or eliminating human intervention by exploiting graph statistics.

Conventional ontology construction methods typically either rely on expert set-off/input or very large corpora or strenuous analysis of the data to produce a formal, but general purpose, ontology, or rely on statistical information to produce unidentified/undefined semantic relations between terms which lack formalization rather than an ontology. The above described method of ontology construction tends to overcome these limitations.

The above described ontology construction methods make use of community detection and the transitive closure of connected terms. This is in contrast to conventional ontology construction methods. Furthermore, the above described method advantageously tends to outperform conventional clustering and related methods by taking advantage of structural information found in networks that typical unsupervised learning techniques ignore.

We claim:

1. A method of constructing an ontology from data, the ontology comprising concepts and relationships between certain of those concepts, and the ontology having a defined structure, the method comprising:
   using the data, constructing, by one or more processors, a lexical graph, wherein:
   the lexical graph comprises a plurality of nodes and a plurality of edges;
   each node of the lexical graph corresponds to one or more data terms;
   each edge of the lexical graph is a connection between two different nodes; and
   the lexical graph further comprises statistical information relating to the data terms;
   selecting, by the one or more processors, as the concepts of the ontology, nodes in the lexical graph that correspond to prominent data terms;
   wherein the step of selecting, as the concepts of the ontology, nodes in the lexical graph corresponding to prominent data terms comprises:
   for each node in the lexical graph, determining a weight of significance; and identifying as a node that corresponds to a prominent data term, those nodes that have a weight of significance greater than or equal to a first predetermined threshold value;
   grouping, by the one or more processors, into one or more groups, the concepts, each group comprising one or more concepts and the grouping comprises performing a community-detection process based on structural similarity of nodes in the lexical graph;
   based on the one or more groups and the statistical information, detecting, by the one or more processors, relationships between the concepts; and
   using a formal ontological specification, the concepts, and the relationships between those concepts, defining, by the one or more processors, the structure of the ontology.

2. A method according to claim 1 wherein constructing a lexical graph comprises performing a synonym-grouping process to group together synonymous data terms.

3. A method according to claim 1 wherein a weight of significance for a node in the lexical graph is determined via statistical methods.

4. A method according to claim 1 wherein the first predetermined threshold value is determined via statistical methods.

5. A method according to claim 1 wherein grouping is performed such that, in each group, each of the concepts in that group is connected to each of the other concepts of that group via either:
   a single edge; or
   one or more concepts of that group and a plurality of edges;
   wherein between any two concepts there is at most one edge.

6. A method according to 1 wherein the community-detection process comprises detecting seed sets by:
   for each pair of concepts that are connected in the lexical graph by a single edge, determining a structural similarity value; and
   for each pair of concepts in the lexical graph, grouping together those two concepts if the structural similarity value calculated for the two nodes is above a second predetermined threshold value.

7. A method according to 6 wherein the community-detection process further comprises expanding each seed set by attaching to it concepts common to those concepts in that seed set such that subgraph modularity is maximised.

8. A method according to claim 1 wherein detecting relationships between the concepts comprises:
   selecting a set of concepts; and
   determining the transitive closure of the selected set of concepts.

9. A method according to claim 8 wherein the transitive closure of the selected set of concepts is determined dependent on interconnections between the concepts in that set and in a given group.

10. A method according to claim 8 wherein selecting a set of concepts comprises selecting a set of concepts such that each selected concept corresponds to the same type of data term.

11. A method according to claim 10 wherein concepts in the selected set and in the overlap of two or more given groups are deemed to have sibling relationships.

12. A method according to claim 11 wherein the overlap is determined by determining the transitive closure of the concepts in the selected set.

13. A method according to claim 8 wherein selecting a set of concepts comprises selecting all of the concepts.

14. A method according to claim 13 wherein concepts in the selected set and in the overlap of two or more given groups are deemed to have sibling relationships or relationships other than sibling relationships.

15. A method according to claim 14 wherein the overlap is determined by determining the transitive closure of the concepts in the selected set.

16. A method according to claim 8 wherein the determination of a transitive closure of the selected set of concept comprises performing a fuzzy Floyd-Warshall algorithm on the selected set.

17. A method according to claim 1 further comprising providing, for use by an application or device the ontology.

18. A method according to claim 1 wherein the formal ontological specification is a formalisation selected from the group consisting of: Resource Description Framework (RDF), Notation 3 (N3), Terse RDF Triple Language (Turtle), N-Triples, Resource Description Framework Schema (RDFS), Web Ontology Language (OWL), Manchester syntax, Functional syntax, Open Biomedical Ontologies (OBO), Knowledge Representation System Specification (KRSS2), and Knowledge Representation System Specification (KRSS).

19. Apparatus for constructing an ontology from data, the ontology comprising concepts and relationships between certain of those concepts, and the ontology having a defined structure, the apparatus comprising one or more processors arranged to:

using the data, construct a lexical graph, wherein:
the lexical graph comprises a plurality of nodes and a plurality of edges;
each node of the lexical graph corresponds to one or more data terms;
each edge of the lexical graph is a connection between two different nodes; and
the lexical graph further comprises statistical information relating to the data terms;
select as the concepts of the ontology, nodes in the lexical graph that correspond to prominent data terms;
wherein the step of selecting, as the concepts of the ontology, nodes in the lexical graph corresponding to prominent data terms comprises:
for each node in the lexical graph, determining a weight of significance; and identifying as a node that corresponds to a prominent data term, those nodes that have a weight of significance greater than or equal to a first predetermined threshold value;
group in to one or more groups, the concepts, by performing a community-detection process based on structural similarity of nodes in the lexical graph, each group comprising one or more concepts;
based on the one or more groups and the statistical information, detect relationships between the concepts; and
using a formal ontological specification, the concepts, and the relationships between those concepts define the structure of the ontology.

* * * * *